United States Patent [19]

Belsheim

[11] 4,130,239
[45] Dec. 19, 1978

[54] SWING-AWAY MAILBOX

[76] Inventor: Rodney W. Belsheim, 607 S. First St., Marshall, Minn. 56258

[21] Appl. No.: 836,406

[22] Filed: Sep. 26, 1977

[51] Int. Cl.² ............................................. F16M 13/00
[52] U.S. Cl. ..................................... 232/39; 248/145
[58] Field of Search ................ 232/39; 248/145, 131, 248/417, 415

[56] References Cited

U.S. PATENT DOCUMENTS

| 857,234 | 6/1907 | Geddes | 232/39 |
|---|---|---|---|
| 1,435,379 | 11/1922 | Connery | 248/145 |
| 1,505,439 | 8/1924 | Skreberg | 248/145 |
| 1,888,111 | 11/1932 | Brown | 248/145 |
| 2,050,573 | 8/1936 | Kammerich | 248/145 |
| 2,079,510 | 5/1937 | King et al. | 248/145 |
| 2,149,050 | 2/1939 | Hajicek | 248/145 |
| 2,280,476 | 4/1942 | Calvert | 248/145 |
| 2,605,073 | 7/1952 | Buck | 248/145 X |
| 3,802,656 | 4/1974 | Virblas | 248/145 |

Primary Examiner—Francis K. Zugel

Attorney, Agent, or Firm—Orrin M. Haugen; Thomas J. Nikolai

[57] ABSTRACT

An improved rural mailbox mounting structure for road-side use which is less subject to damage due to impact from snowplows and the like. A platform on which the mailbox is attached is connected to a tubular sleeve bearing at a predetermined angle. Affixed to a mounting post and extending outwardly therefrom toward the road in a horizontal plane is a mounting plate. Secured to the mounting plate is a cylindrical rod which extends upwardly therefrom at an angle which is the supplement of the predetermined angle formed between the mailbox mounting platform and the longitudinal axis of the sleeve bearing. Therefore, when the sleeve bearing is positioned over the cylindrical rod, gravitational force tends to maintain the mailbox platform in a horizontal plane. When the mailbox is struck, it yields to the striking force and rotates about the cylindrical rod as an axis. When the force is removed, gravity again returns the mailbox to its normal position.

3 Claims, 2 Drawing Figures

SWING-AWAY MAILBOX

BACKGROUND OF THE INVENTION

This invention relates generally to apparatus for supporting a rural roadside mailbox and more specifically to a simple, low-cost, highly rugged mounting structure which is less subject to damage due to impact from passing vehicles than known prior art arrangements.

In many parts of America, there exists a running battle between the roadside mailbox and the snowplow. Until now, the snowplow has usually prevailed with the mailbox ending up lying on the ground. The primary reason for the supremacy of the snowplow apparently is that most mailbox installations, by the roadside, attempt to withstand the concussion of plowed snow by using brute strength. In time, even the stronger mailbox supports begin to succumb to the battering of repeated plowings.

SUMMARY OF THE INVENTION

The present invention seeks to address the foregoing problem with a different approach. As does the willow survive the wind by bending while a rigid oak breaks, so does the mailbox mounting device of the present invention yield with the pressure of the snow instead of resisting like conventional prior art mailbox supports. More specifically, the mailbox and its associated mounting platform are affixed to a sleeve bearing which is tilted with respect to the vertical by a predetermined angle. The sleeve bearing is, in turn, attached to a post by adjustable straps and brackets so as to accommodate a wide range of post sizes. When the mailbox is struck, it tends to rotate about the sleeve bearing and thus yields to the striking force.

DESCRIPTION OF THE PREFERRED EMBODIMENT

Figure 1:
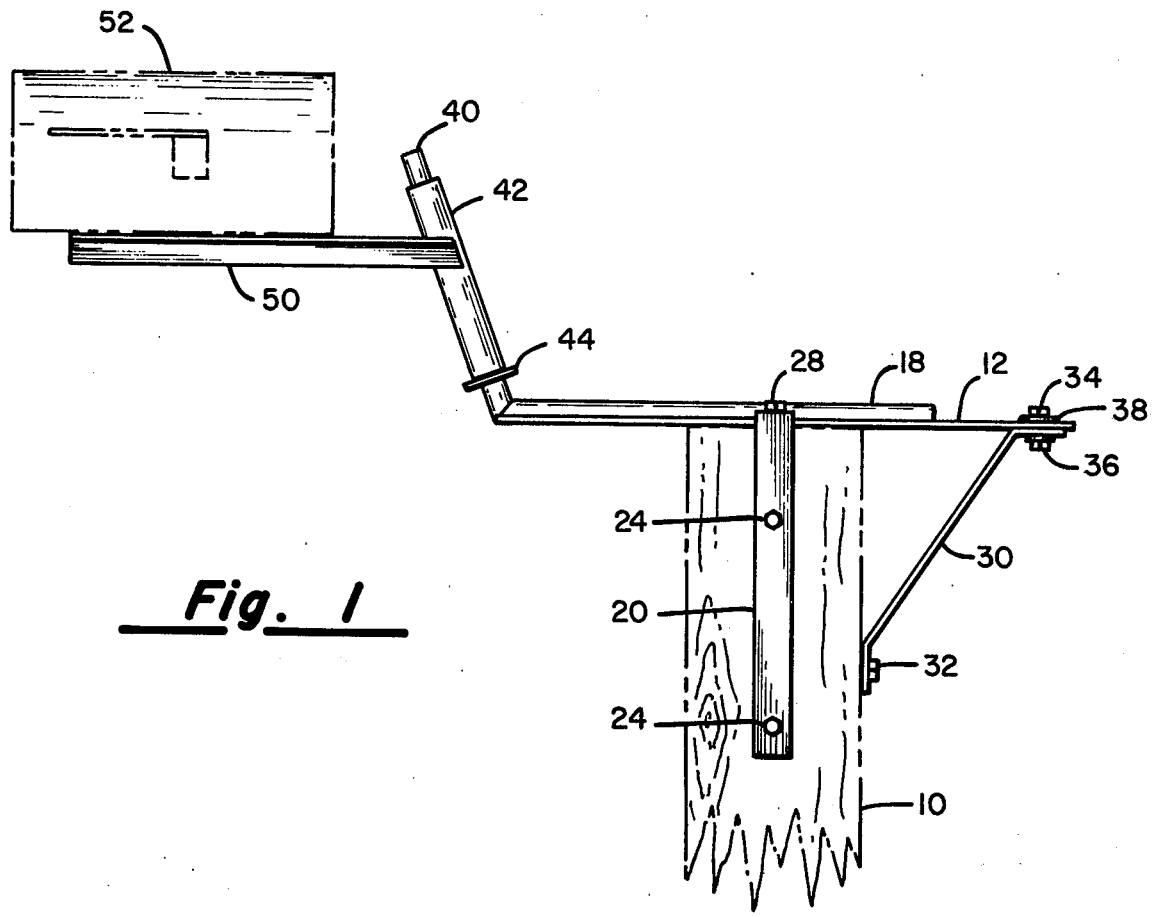
FIG. 1 is a side elevation view of the preferred embodiment.

Referring first to FIG. 1, there is shown a mounting post 10 which may be made from wood, metal or any other suitable material. The post 10 may have a round cross-section or, alternatively, may have a rectangular cross-section and extends into the ground a sufficient distance to provide needed rigidity. Disposed on the top surface of the post 10 is a mounting plate 12 which may comprise first and second rectangular steel plates 14 and 16 which are spaced apart from one another. Located in the space between the plates 14 and 16 is a metal rod or pipe 18 which may be welded or otherwise affixed to the plates 14 and 16 along the line of contact.

The assembly thus far described is secured to the mounting post 10 by means of a pair of L-shaped straps 20 and 22. As is shown, one leg of the L-shaped straps 20 and 22 is secured to the mounting post 10 by means of lag bolts 24 or other suitable fasteners. The other legs of the L-shaped straps 20 and 22 have a slotted hole 26 formed therein and this leg overlaps the mounting plates 14 and 16. Passing through the slotted holes 26 and into slotted apertures in the mounting plates 14 and 16 are bolts 28. Because the overlapping legs of the L-shaped straps and the mounting plates have slotted holes, the straps 20 and 22 may be moved back and forth to accommodate mounting posts 10 of differing sizes. To accommodate a post of more narrow cross-section, the L-shaped brackets may be reversed with the horizontal leg of the straps placed under the mounting plates 14 and 16 and pointing outward.

Figure 2:
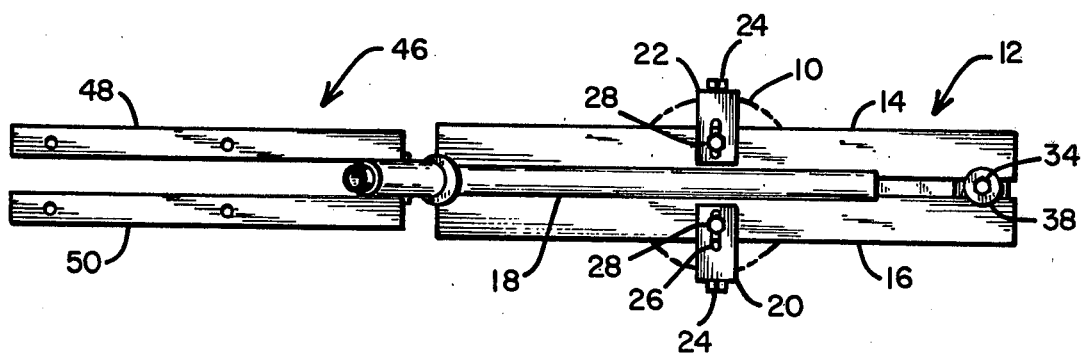
FIG. 2 is a top view of the preferred embodiment with the mailbox unit itself removed.

To add further rigidity, an angle bracket 30 is provided which is also connected to the rear side of the post 10 by means of a lag bolt 32, the term "rear" referring to the side of the post which is away from the road. The angle bracket 30 is adjustably connected to the mounting plate 12 by means of a bolt 34, a nut 36 and a washer 38. As can best be seen from FIG. 2, the washer 38 rests on the top surface of the mounting plate 14 and 16 and the bolt 34 passes through the space between these two plates and through an aperture in the angle bracket 30. Again, by sliding the bracket assembly back and forth within the space defined between the mounting plate 14 and 16, variations in post size can be accommodated.

Welded to the front end of the rod or pipe 18 is a cylindrical member 40 which, too, may be solid or tubular. The rod 40 is welded or otherwise affixed to the rod 18 so as to form a predetermined angle with respect to the vertical. This angle is preferably in the range of 15° to 40°. It is, of course, possible that rods 40 and 18 be a single rod which is bent to provide the upward angulated extension. Fitting over the rod 40 is a cylindrical sleeve 42 having a diameter slightly greater than the diameter of the rod 40 which it surrounds to thereby permit rotation. A stop member 44 is provided on the rod 40 to prevent the sleeve 42 from slipping down and binding against the horizontal rod 18.

Welded or otherwise affixed to the sleeve member 42 is the mailbox mounting platform indicated generally by numeral 46. The mounting platform in the preferred embodiment comprises first and second angle iron bars 48 and 50 which are welded on opposite sides of the sleeve 42. Angle iron bars 48 and 50 are attached to the sleeve member 42 at an angle with respect to the longitudinal axis of the sleeve so that when the sleeve is positioned on the tilted cylindrical rod 40, the top surfaces of the angle iron bars 48 and 50 will lie in a horizontal plane. A mailbox 52 of conventional design is secured to the mounting platform 46 by means of screws or other fasteners. The end of the rod 40 may be threaded to receive an internally threaded collar (not shown) which when tightened in place will prevent easy removal of the box and platform from the stand, and thereby discourage theft.

The length of the angle iron bars 48 and 50, as well as the length of the members 14 and 16, are such that the post 10 may be located a safe distance from the side of the road with the mailbox 52 extending out toward the roadway a sufficient distance to comply with Postal requirements. The support bracket 30 compensates for the weight of the assembly extending forwardly from the post 10.

It will be apparent from the foregoing description that the rural mailbox, when so mounted, will be less subject to damage by passing vehicles and snowplows than are conventional rigidly mounted mail receptacles. In the event that the mailbox 52 is struck by a plow or by the snow being pushed by such a plow, it will rotate with the impact. Because the rod 40 is tilted at an angle with respect to the vertical, the mailbox will rotate upward, but when the impact force is removed, the force of gravity will tend to cause the mailbox to rotate downward, back to its normal, horizontal position.

Having thus described my invention, what I claim and desire to secure by Letters Patent in the United States is:

1. Improved roadside mailbox mounting apparatus comprising:
   (a) a tubular sleeve having a mailbox support member affixed thereto at a predetermined angle with respect to the axis of said tubular sleeve;
   (b) a first cylindrical rod having a smaller diameter than that of said tubular sleeve, said first rod adapted to pass through said sleeve;
   (c) a mounting plate affixed to said first cylindrical rod at one end thereof at an angle with respect to the axis of said rod which is the supplementary angle of said predetermined angle;
   (d) first and second L-shaped straps having one leg thereof secured to opposite sides of said post and the other leg thereof to said mounting plate; and
   (e) an angle bracket connected at one end to said post and at the other end to said mounting plate,
   the connection between said bracket and said mounting plate being adjustable, and said L-shaped straps each having a slotted hole in said other leg thereof.

2. Apparatus as in claim 1 wherein said mounting plate comprises first and second rectangular straps and a second cylindrical rod, said first and second mounting plates being affixed to either side of said second cylindrical rod and extending beyond a first end of said second cylindrical rod and wherein said first cylindrical rod is welded at its said one end to the second end of said second cylindrical rod.

3. Apparatus as in claim 1 wherein said predetermined angle is in the range of from 15° to 40°.

* * * * *